(12) United States Patent
Chidiac et al.

(10) Patent No.: US 7,512,553 B2
(45) Date of Patent: Mar. 31, 2009

(54) SYSTEM FOR AUTOMATED PART-NUMBER MAPPING

(75) Inventors: Ghassan Chidiac, Wappingers Falls, NY (US); Jayant R. Kalagnanam, Tarrytown, NY (US); Moninder Singh, Farmington, CT (US); Sudhir Verma, Yorktown Heights, NY (US); Fabio Dennis White, New Windsor, NY (US); Michael D. Patek, Philadelphia, PA (US); Yuk Wah Wong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1248 days.

(21) Appl. No.: 10/727,978

(22) Filed: Dec. 5, 2003

(65) Prior Publication Data

US 2005/0125311 A1  Jun. 9, 2005

(51) Int. Cl.
*G06Q 10/00* (2006.01)
(52) U.S. Cl. .............................. 705/28; 705/29; 705/22
(58) Field of Classification Search ....................... None
See application file for complete search history.

(56) References Cited

U.S. PATENT DOCUMENTS 6,988,111 B2 * 1/2006 Chow et al. ............. 707/104.1
7,127,458 B1 * 10/2006 Mantripragada et al. ....... 707/6
7,392,255 B1 * 6/2008 Sholtis et al. ................ 707/203
2002/0188528 A1 * 12/2002 Adelman et al. .............. 705/28
2004/0024662 A1 * 2/2004 Gray et al. .................... 705/29

OTHER PUBLICATIONS

"Enterprise modeling and simulation: complex dynamic behavior of a simple model of manufacturing", Mujtaba, M. Shahid, Hewlett-Packard Journal, vol. 45 No. 6, p. 80, Dec. 1994.*

"An application of designing products and processes of supply chain management", Garg, A., IIE Transactions, vol. 31 No. 5, p. 417, May 1999.*

"Text Chunking Based on a Generalization of Winnow", T. Zhang, et al., Journal of Machine Learning Research 2 (2002) 615-637.

(Continued)

*Primary Examiner*—F. Zeender
*Assistant Examiner*—Christopher Buchanan
(74) *Attorney, Agent, or Firm*—Whitham, Curtis, Christofferson & Cook, PC; Stephen C. Kaufman (57) ABSTRACT

Automated mapping of part numbers associated with parts in a bill of materials (BOM) to internal part numbers assigned by a BOM receiver. Historical data on bills of materials, known part number mappings, and parametric data describing the parts associated with bills of materials re received. Prediction models, for predicting BOM receiver internal part numbers, are learned from the historical BOM data, known part number mappings data and parametric data. The learned models are applied to unmapped BOM originator part numbers to assign BOM receiver internal part numbers.

1 Claim, 9 Drawing Sheets

OTHER PUBLICATIONS

"Text Categorization With Support Vector Machines: Learning With Many Relevant Features", T. Joachims, Universtat Dortmund, Fachbereich Informatik, Lehrstuhl VIII, Kunstliche Intelligenz; 1997, pp. 1-14.

"Using Maximum Entropy for Text Classification", K. Nigam, et al, School of Computer Science Carnegie Mellon University, Pittsburgh, Pa.

"A Comparative Study on Feature Selection in Text Categorization", Y. Yang, et al., School of Computer Science Carnegie Mellon University, Pittsburgh, Pa.

"A Comparison of Event Models for Naive Bayes Text Classification", A. McCallum, et al., School of Computer Science Carnegie Mellon University, Pittsburgh, Pa.

* cited by examiner

SYSTEM FOR AUTOMATED PART-NUMBER MAPPING

BACKGROUND OF THE INVENTION

1. Field of the Invention

The present invention generally relates to part numbering for controlling and identifying parts used in the manufacture of products and, more particularly, to a system and method for automated mapping of part numbers associated with parts in a bill of materials.

2. Background Description

Part numbers are widely used within an enterprise throughout the manufacturing process. The point of entry of such part numbers into the manufacturing process is normally via a Bill of Materials or BOM sent by a contact manufacturer or supplier. For example, many companies require the use of a constant and uniform method to control and identify the millions of parts used throughout their manufacturing processes. The frequent and pervasive use of these numbers demands that they be accurately and quickly propagated through the system to ensure smooth operation. Also keeping track of price and other non-price attributes of the parts allows for comparison with the company-specific suppliers' cost for the same part or previously mapped parts.

One of the main bottlenecks to accuracy and speed of entering part numbers exists at the actual entry to the manufacturing process, the receipt of a Bill of Materials (BOM). A BOM typically consists of several line items, each line item containing information on one specific part. This information includes, amongst other things, the BOM sender's part number, the BOM receiver's corresponding internal part number for the part in question, a textual description of the part, the name of the supplier, etc. However, in a substantial number of cases, the BOM receiver's internal part number is absent. Moreover, it also often occurs that both the BOM receiver's internal part number as well as the BOM sender's part number are missing. In both cases, it becomes imperative to map that line item to the appropriate internal part number assigned to that part by the BOM receiver.

Historically, this mapping process has been done manually which is a highly time-consuming, labor intensive and error-prone process. Attempts at automating this process have been limited to simple string similarity methods, keyword searches or simple rule-based systems. These methods too have produced little improvement, since more often that not, these methods fail to produce appropriate mappings and the task has to be done manually once again. No one has tried to use full-fledged machine learning methods to automatically learn models for mapping such part numbers by using information about the part that is available in the corresponding BOM line item such as part description, supplier information and so on.

SUMMARY OF THE INVENTION

It is therefore an object of the present invention to provide a system for automated mapping of part numbers associated with parts in a bill of materials (BOM) submitted by a BOM originator to internal part numbers assigned to those parts by a BOM receiver.

According to the invention, machine learning methods are used to automatically learn models for mapping BOM line items to the appropriate internal part numbers assigned to those parts by the BOM receiver. These models are learned from historical BOM data comprising of BOMs that have been submitted by various third parties over time, such as contract manufacturers, Original Equipment Manufacturers (OEMs) and suppliers. In addition to this historical BOM data, we also use historical mapping data consisting of known mappings of internal part numbers to the part numbers of various third parties, parametric data that describes the parameters and their values that are specific to various parts (e.g., product A is a 12 ohm resistor that can carry a 1 ampere current) and taxonomic data that describes a taxonomy over the entire part repository (e.g., the parts may all be divided into a set of commodity classes, each such commodity class may be further divided into a part type class, each such part type class may contain leaf classes, each leaf class then contains a set of similar products). Furthermore, we also use any domain specific expert knowledge as well as domain specific vocabulary which may be available from various sources and/or domain experts.

The specific approach is made novel even further by the fact that this system consists of a hierarchical modeling and mapping approach. First, we use the available BOM, mapping, and taxonomic data, along with any available expert knowledge and vocabulary to create classification models for various levels of the part taxonomy that take a given BOM item (containing information such as part description, supplier name about a certain part) and predict the class of products (at a given level in the taxonomy) the given part belongs to. For example, in the example taxonomy described above consisting of commodities, part type classes, leaf classes and parts, classification models are built to take the BOM information for a particular part and predict the commodity class it belongs to. Similarly, models are built for predicting part type classes as well as leaf classes. Since as we go down the taxonomy, each node corresponds to fewer and fewer parts, we are able to use the taxonomic data to enhance the quality of the mapping job done since one has to discriminate between fewer parts. For example, once we are able to predict which commodity a given BOM part belongs to, we only have to look at parts of that commodity class to determine the correct internal part number for that BOM item, rather than look at the entire universe of parts belonging to all possible commodity classes. The further down we go into the taxonomy, the smaller is the set of possible candidates for the part number we are trying to predict. This is one salient advantage over current approaches where a BOM item data is processed and used to directly map it to an internal part number, an increasingly difficult, computationally intensive and more error prone task than ours since it requires the mapping process to select one part directly from amongst millions of possible candidates.

After the creation of the classification models, extraction models are created to extract parametric information about a part from the part description part of the BOM item. This description is in the form of unstructured text, often lacking even basic punctuation. However, this description contains various parametric data about the part it is describing which can, in turn, be used to identify the internal part, and hence the internal part number, in question. The extraction models that are learned from the historical data enable the extraction of these parameters and their values from this data, thus enabling their matching to the parametric data for the internal part repository which results in the identification of the part, and hence its part number. Parametric models are learned for each class at different levels of the taxonomy. For example, parametric models created for each leaf class in the taxonomy enables the differentiation between the set of parts belonging to that leaf class based on the parametric data that defines those parts.

After these two types of models are created, the actual mapping process is carried out in a hierarchical way. First, the classification models are used to predict the class of products (at some set level of the taxonomy) to which the part in question belongs. For example, we may decide to predict the leaf class to which the part belongs. Then, we take the extractor model for the predicted class (in the above example, it would be the predicted leaf class) and extract the parametric data from the part description in the BOM. Finally, we match this parametric data with the data in the parametric data repository-for all parts belonging to the predicted class to identify the part in question. The internal part number for this predicted part is then assigned to the supplier part number given in the BOM.

Furthermore, the entire mapping process can be configured to work with human intervention, with varying levels of human involvement, to further improve the mapping process. For example, human inputs can be provided at any level of the taxonomy to fix the class of the product at that level of the taxonomy. This improves the results of classification at lower levels of the taxonomy, such as the leaf class level. If a leafclass class information is provided by human to search the part, the error-rate up to this level is reduced to 0. And a specific leafclass model can then be applied to predict a part.

Moreover, the human can also be allowed to intervene, up to varying degrees, in the mapping process to correct the automatic mapping process. For example, a human may be allowed to change the class of the part at a particular level of the taxonomy from the one automatically determined by the mapping engine since the human believes that the one being suggested by her is more appropriate than that being recommended by the engine. Besides allowing for better results during the current mapping task, this also helps in improving predictions in the future.

Finally, along with the mapping of the BOM-originator part number to an internal part number, the system can also generate a level of confidence it has in the mapping being correct. In case the confidence level is not high enough (which can be a human setable attribute), the system can instead generate a list of likely internal part numbers, along with confidence values, which can then be perused by humans to select the single most appropriate mapping.

Another feature of the system is its automatically (or with human intervention) monitoring of performance and relearning of models. A monitoring component keeps track of its performance and number of new matches per class per level. The performance measure could be precision and recall over a constant set of new instances. Or it could be just a constant count of new maps or mismaps. If the performance measures start to degrade with new instances with the margin of some constant, or if the measure were not impressive when the system was deployed (due to the lack of descriptions) to begin with, the monitoring component either relearns models automatically, or signals for human intervention to enable relearning of the model(s) for a particular class(es) in one or more particular level or levels. This also prevents over fitting for the classes for which the performance is high. These suggestions/alarms helps the system to become adaptive with new descriptions, which in turn improves performance in on-going mappings of BOMs.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
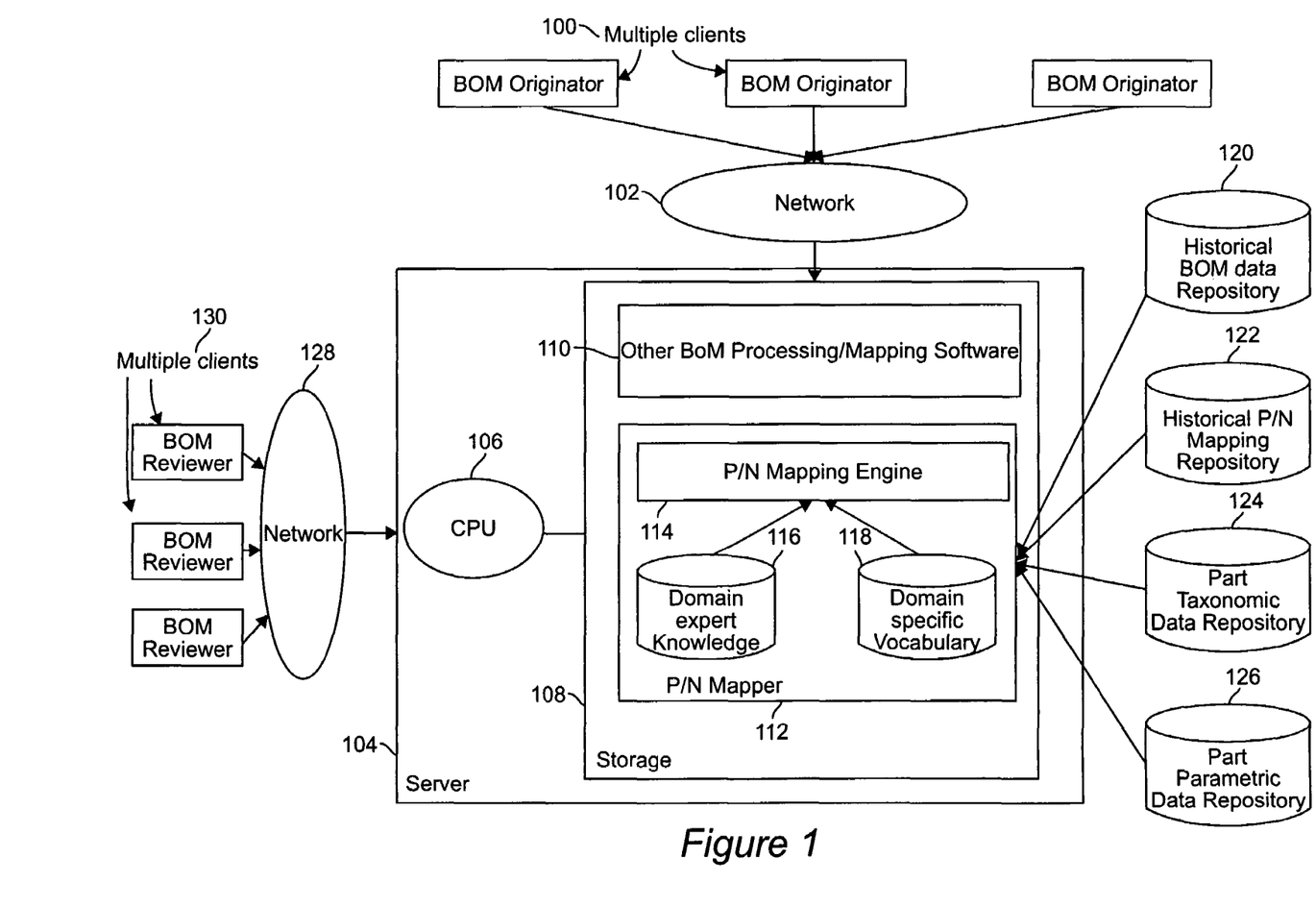
FIG. 1 is a block diagram of one preferred embodiment of present invention.

Referring now to the drawings wherein like reference numerals denote the same or similar parts, and more particularly to FIG. 1, there is shown a block diagram of one preferred embodiment of the invention. In this embodiment, multiple clients as BOM originators 100 are connected via network 102 to a server 104. The server 104 comprises a central processing unit (CPU) 106 and storage 108. The storage 108, in turn, comprises other BOM processing/mapping software 110 and a part number (P/N) mapper 112. The P/N mapper 112 includes a P/N mapping engine 114 which accesses a domain expert knowledge (dek) database 116 and a domain specific vocabulary (dv) 118. The P/N mapping engine is described in more detail in FIG. 3 and the associated description. The dek database contains information specific to the domain for which the P/N mapper is being used that may be available via human experts, books, manuals, etc. Such information may include different names used by various suppliers, known relationships between various concepts and phrases/words used in part descriptions, or any other kind of information that may be useful for automated part number mapping in that domain. The dv consists of keywords, phrases, words, abbreviations, synonyms, etc., that are specific to the domain and can be useful in relating different part descriptions during the mapping process. Both the dek and dv are not necessary for automated P/N mapping, but will enhance the performance of the system if available. The P/N mapper 112 also has access to several external databases. These include a historical BOM data database 120, a historical P/N mapping repository database 122, a part taxonomic data database 124, and a part parametric data repository database 126. The historical BOM data database 120 contains a repository of the various BOMs that have been sent to the BOM receiver in the past. Each BOM consists of one ore more BOM items, each BOM item having information about exactly one part, such as part description and supplier name. The historical P/N mapping database consists of known mappings of different supplier part numbers to the BOM receiver's internal part numbers. The part taxonomic database 122 contains information on the hirarchical organization of all the parts, while the part parametric data repository contains the specifications that uniquely define each such part. All four types of data are necessary for the automated mapping of part numbers. In addition to being connected to multiple clients 100 through network 102, the server 104 is also connected through network 128 to other multiple clients 130 as BOM reviewers.

Upon receipt of a BOM from a BOM originator, such as a Contract Manufacturer (C/M), the receiver must evaluate all the BOM items to make sure that the receiver's internal part number is known for the parts described by the BOM items. Ideally, each BOM item contains both the BOM originators's part number as well as the BOM receiver's internal part number for the part described by that item. However, in practice, the BOM receiver's internal part number is often missing, and, hence, the part must be mapped to the correct internal part number before the BOM can be released into the receiver's manufacturing environment.

Figure 2:
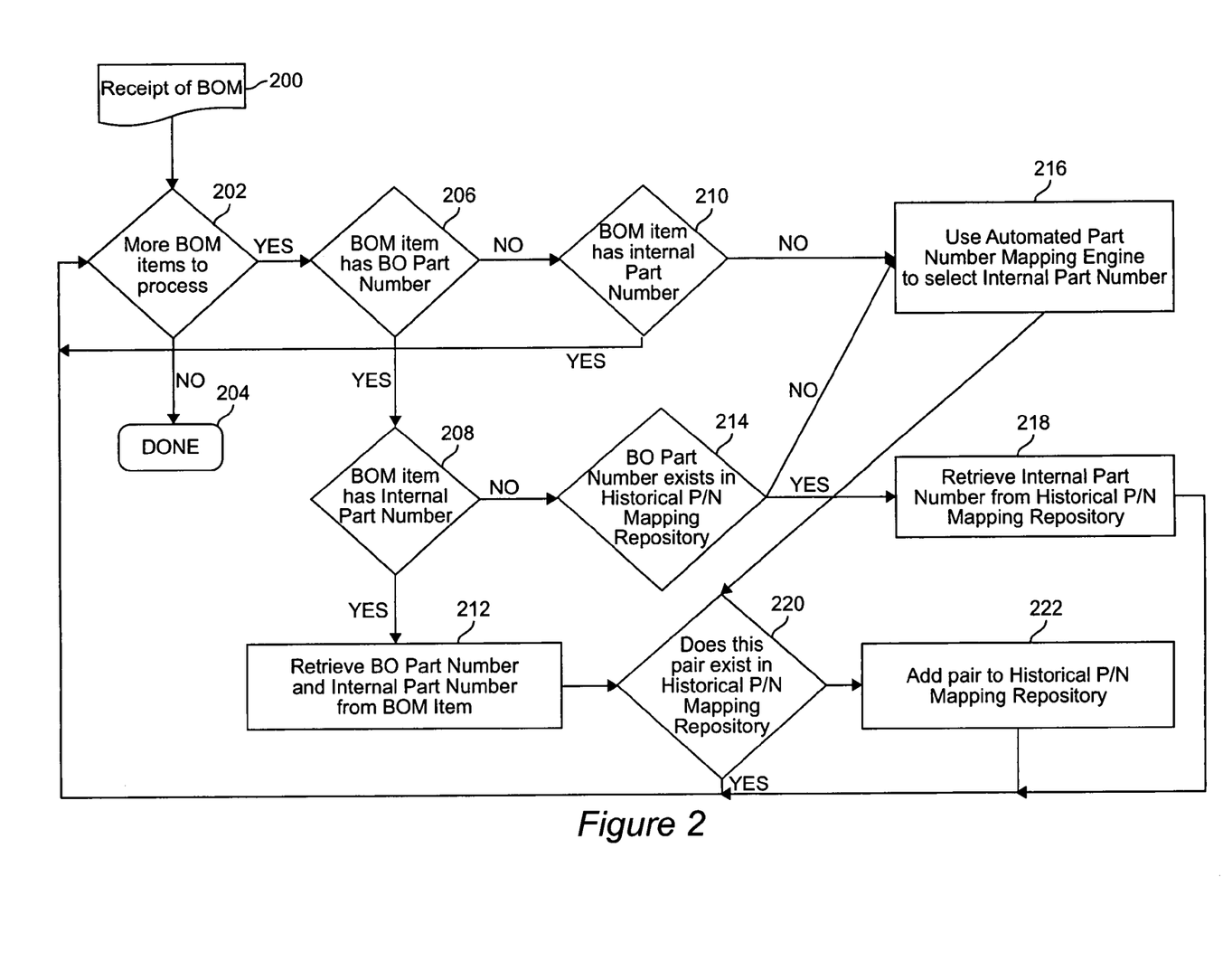
FIG. 2 is a flow chart of a process that may be followed for part number mapping using an embodiment of the present invention.

The flow chart of FIG. 2 depicts this process for part number mapping using the automated part number mapper of FIG. 1. The process begins with the receipt of the BOM at input block 200. A determination is made in decision block 202 as to whether there are more BOM items to process. If not, the process is finished and exits at output block 204; otherwise, a determination is made in decision block 206 as to whether a BOM item has a BOM originator (BO) part number, such as a C/M part number. If so, the process goes to decision block 208; otherwise, the process goes to decision block 210. If the process goes to decision block 208, a determination is made as to whether the BOM item has an internal part number. If so, the BO part number and the internal part number are retrieved from the BOM item in function block 212; otherwise, a determination is made in decision block 214 as to whether the BO part number exists in the historical P/N mapping repository. If not, the process goes to function block 216 where the automated part number mapping engine is used to select the internal part number. Similarly, in decision block 210, a determination is made as to whether the BOM item has an internal part number. If so, then the task is complete since the internal part number is now known, and the process returns to decision block 202 to determine if the process is complete. If not, then once again the process goes to function block 216 where the automated part number mapping engine is used to select the internal part number. If, however, it is determined in decision block 214 that a BO part number exists in the historical P/N mapping repository, then the process goes to function block 218 where the internal part number is retrieved from the historical P/N mapping repository. At that point in the process, a return is made to decision block 202 to determine if the process has completed. Returning to function block 216, after the automated part number mapping engine has selected the internal part number, the process goes to decision block 220 where a determination is made as to whether the pair exists in the historical P/N mapping repository. If so, a return is made to decision block 202; otherwise, the process goes to function block 222 where the part is added to the historical P/N mapping repository, after which a return is made to decision block 202.

In order to do automated part number mapping in accordance with the present invention, the part number mapping engine 114 must first create predictor models for the available data, and then must apply these models to BOM data to determine the internal part numbers. The various components needed by the part number mapping engine to do these tasks are shown in the block diagram of FIG. 3. The part number mapping engine 114 includes part number predictors 302, part class predictors 304, feature extractors 306, feature selectors 308, classifier learners 310, extractor-model learners 312, attribute-value pair matchers 314, and machine learning libraries 316. Feature extractors 306 consist of methods for tokenizing text, such as part descriptions, and converting them into a set of features for use in model creation. Tokenization is the step of breaking down the textual information about the part into a set of strings according to some rules, such strings being words, phrases, or character strings. Those skilled in the art will appreciate that several different methods for tokenization are available in the open literature. One common method of doing tokenization simply involves the breaking down of text into words based on whitespace and punctuation. Another widely used method involves the use of n-grams (substrings of length "n") where the text is broken down into tokens consisting of contiguous sequences of "n" characters, where "n" is an integer such as 1, 2, and so on. See, for example, R. Baeza-Yates and B. Ribeiro-Neto, *Modern Information Retrieval*, Addison Wesley Press (1999). One or more such tokenization techniques may be applied, either independently or in sequence, to generate a set of tokens. Similarly, those skilled in the art will appreciate that several different methods for converting these tokens to features have been described and used in the open literature. One common method involves the creation of a binary feature for each token seen in the data set. The textual information about the part in a BOM item is then replaced by a list of features created of all the tokens seen in the data set, a feature taking a value of one if the associated token exists in the part information in that BOM item, and a value zero otherwise. Feature selectors 308 consist of methods for determining a subset of features created by the feature-extractors that are the most appropriate and useful for creating the most accurate models. Those skilled in the art will appreciate that several different methods of feature selection are available in the open literature. One common method, called document frequency, is based on the number of times a particular feature is observed in the part information for the various BOM items. See, for example, Y. Yang and J. O. Pedersen, "A Comparative Study on Feature Selection in Text Categorization", *Proc. of the 14$^{th}$ International Conference on Machine Learning ICML97*, pp. 412-420, 1997. The idea behind this approach is that more frequent features are more useful for classification than less frequent features. Another approach based on the same principle, called the CHI test, uses a statistical test to determine which features are more relevant.

Figure 3:
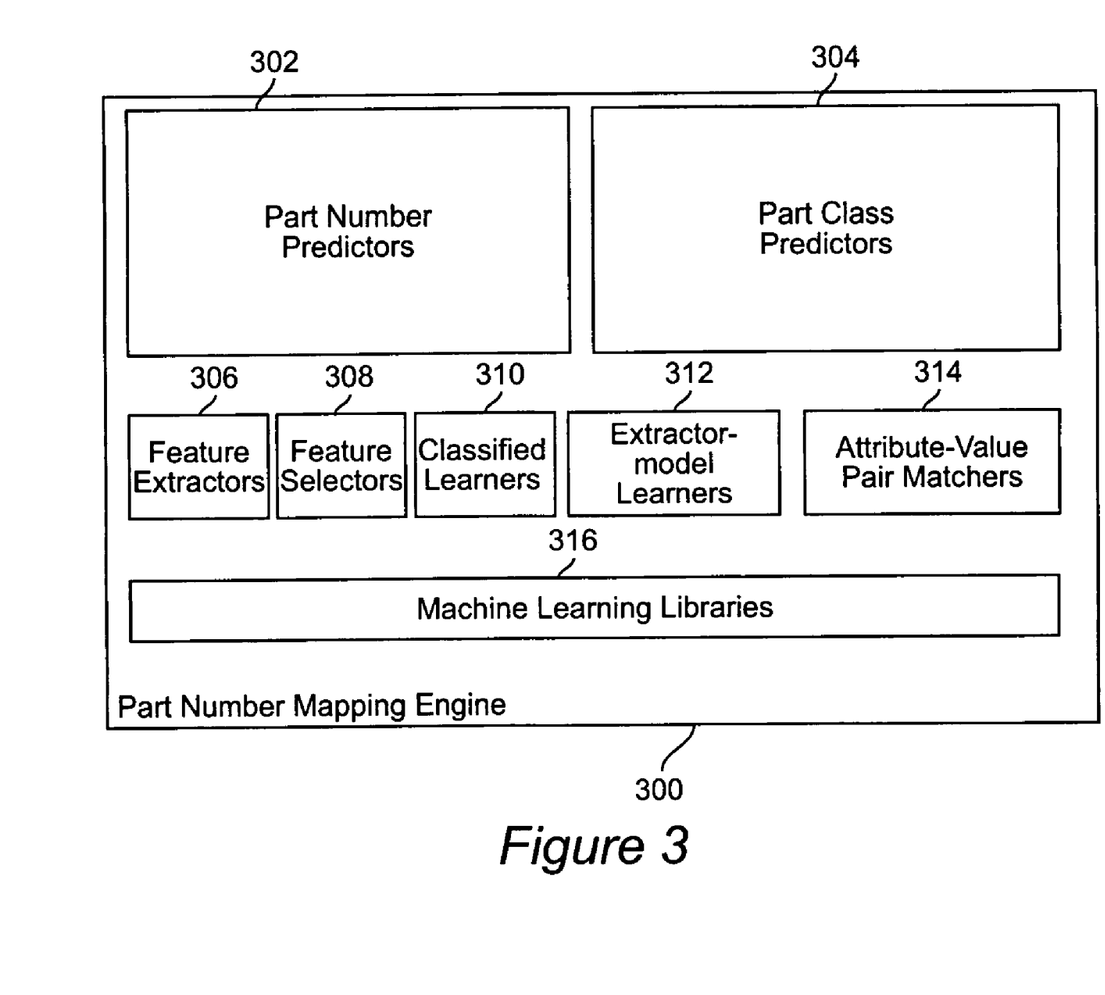
FIG. 3 is a block diagram of the components of the part number mapping engine.

While the part class predictors 304 are the actual models that are used to predict the class to which a particular part belongs at a certain level of the taxonomy, the classifier learners 310 are the methods for creating these models from the historical data. Similarly, while the part number predictors 302 are the actual models for predicting the internal part number for a given BOM part based on information about the part and the historical and paramteric data, the extractor model learners are one type of methods for learning such models. These models are created to extract parametric information about a part from the part description portion of the BOM item. This description is in the form of unstructured text, often lacking even basic punctuation. However, this description contains various parametric data about the part it is describing which can, in turn, be used to identify the internal part, and hence the internal part number, in question. The parametric information extracted by these models enables its matching to the parametric data for the internal part repository which results in the identification of the part, and hence its part number. Those skilled in the art will appreciate that there are several different kinds of such models described in the open literature. Similarly, there are several different methods of creating such models in the open literature. Approaches for creating and representing class prediction models generally attempt to determine relationships between the information about the parts in the BOM items and the actual internal part numbers to build classification models that can predict the internal part number, given some information about a part with unknown internal part number. Approaches that are common include maximum entropy methods (Kamal Nigam, John Lafferty, and Andrew McCallum, "Using maximum entropy for text classification", *IJCAI*-99 *Workshop on Machine Learning for Information Filtering*, pp. 61-67, 1999), support vector machines (T. Joachims, "Text Categorization with Support Vector Machines: Learning with many relevant features", *Machine Learning: ECM*-98, *Tenth European Conference on Machine Learning*, pp. 137-142, 1998) and Bayesian methods (A. McCallum and K. Nigam, "A comparison of event models for Naive Bayes text classification", *AAAI*-98 *Workshop on Learning for Text Categorization,* 1998), amongst others. For part number predictor models again, several approaches can be used to build such models for extracting parametric data from textual information, again by attempting to discover relationships between textual descriptions and the parameter names and values. Some approaches include generalized winnow (T. Zhang, F. Damerau and D. Johnson, "Text chunking based on a generalization of Winnow", *Journal of Machine Learning Research*, pp. 615-627, 2002) and rapier (Mary Elaine Califf, "Relational Learning Techniques for Natural Language Information Extraction", PhD Thesis, University of Texas at Austin, August 1998). Attribute-value pair matchers 314 are methods for matching attribute-value pairs extracted by the part number predictors from the BOM part information with the data in the part parametric data repository 126 to determine the best match for the part in question. While the simplest such method may simply count the number of matches, other methods may use elaborate wighting schemes and string similarity measures to get more accurate results. Finally, machine learning libraries 300 refers to a collection of basic machine learning algorithms that are used by one or more of the components of the part number mapping engine. Such algorithms include string matching methods, algorithms to compute statistical measures, algorithms to facilitate proper evaluation of learned models, etc.

Figure 4:
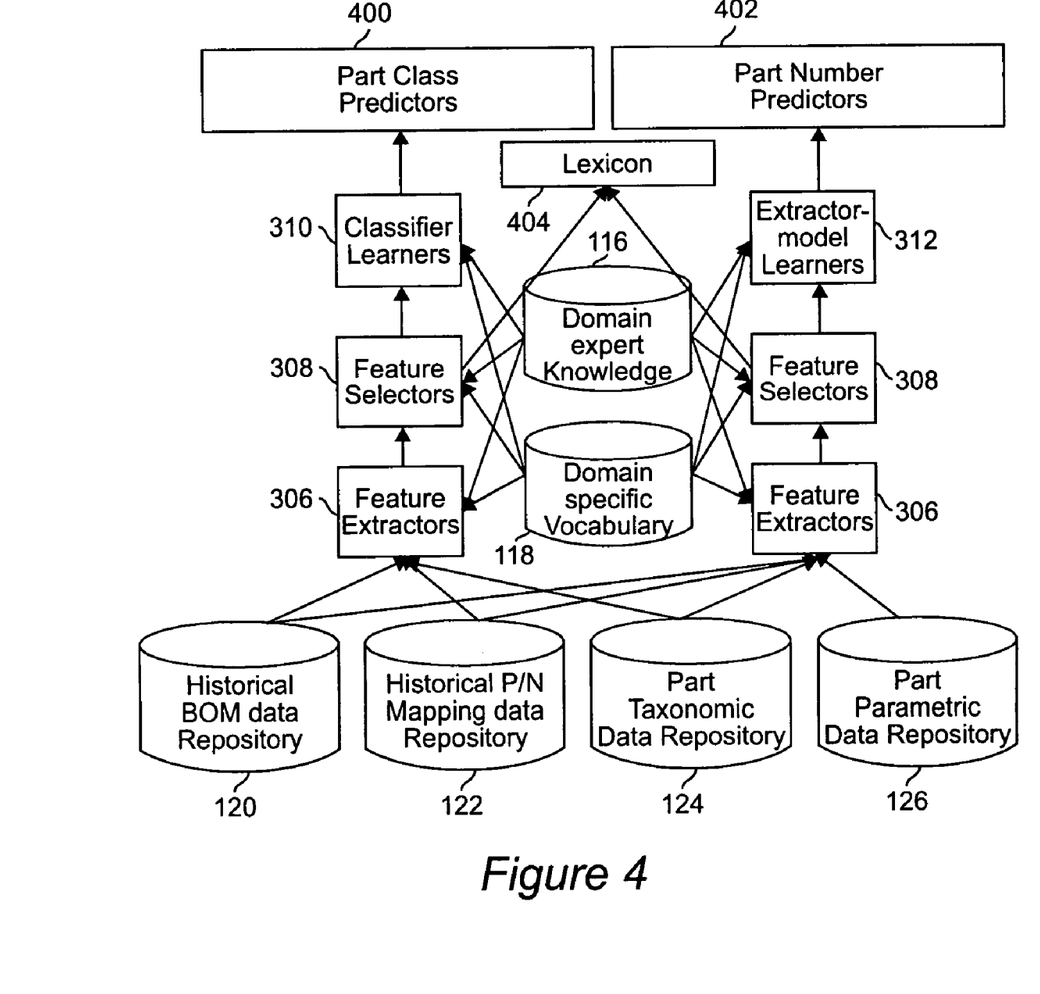
FIG. 4 is a block diagram showing the creation of the predictor models used by the part number mapping engine.

FIG. 4 is a block diagram showing the interaction of the various functional components described in FIG. 3 during the creation of the predictor models used by the part number mapping engine of FIG. 3. The detailed process for the creation of these methods is described in FIGS. 5A and 5B. The part class predictors 400 are created by applying classifier learners 310 to the data produced by the feature selectors 308 along with domain expert knowledge 116 and domain vocabulary 118. The feature selectors also access and modify the lexicon 404. The feature selectors 308 in turn produce the data for the classifier learners from the data transformed by applying the feature extractors 306 to the data from the historical BOM data repository 120, historical P/N mapping data repository 122 and the part taxonomic data repository 124, described in FIG. 1. In this exercise, the feature selectors also access the domain expert knowledge 116 as well as the domain vocabulary 118. The part number predictors 402 are similarly created by applying the extractor model learner 312 to the data produced by the feature selectors 308, along with domain expert knowledge 116 and domain vocabulary 118. The feature selectors 308 produce this data for the extractor model learners from the transformed data produced by the feature extractors 306 from the data accessed from the part parametric data repository 126, as well as the historical BOM data repository 120, historical P/N mapping data repository, and the part taxonomic data repository 124. The feature extractors too use the domain expert knowledge 116 and the domain vocabulary 118.

Figure 5A:
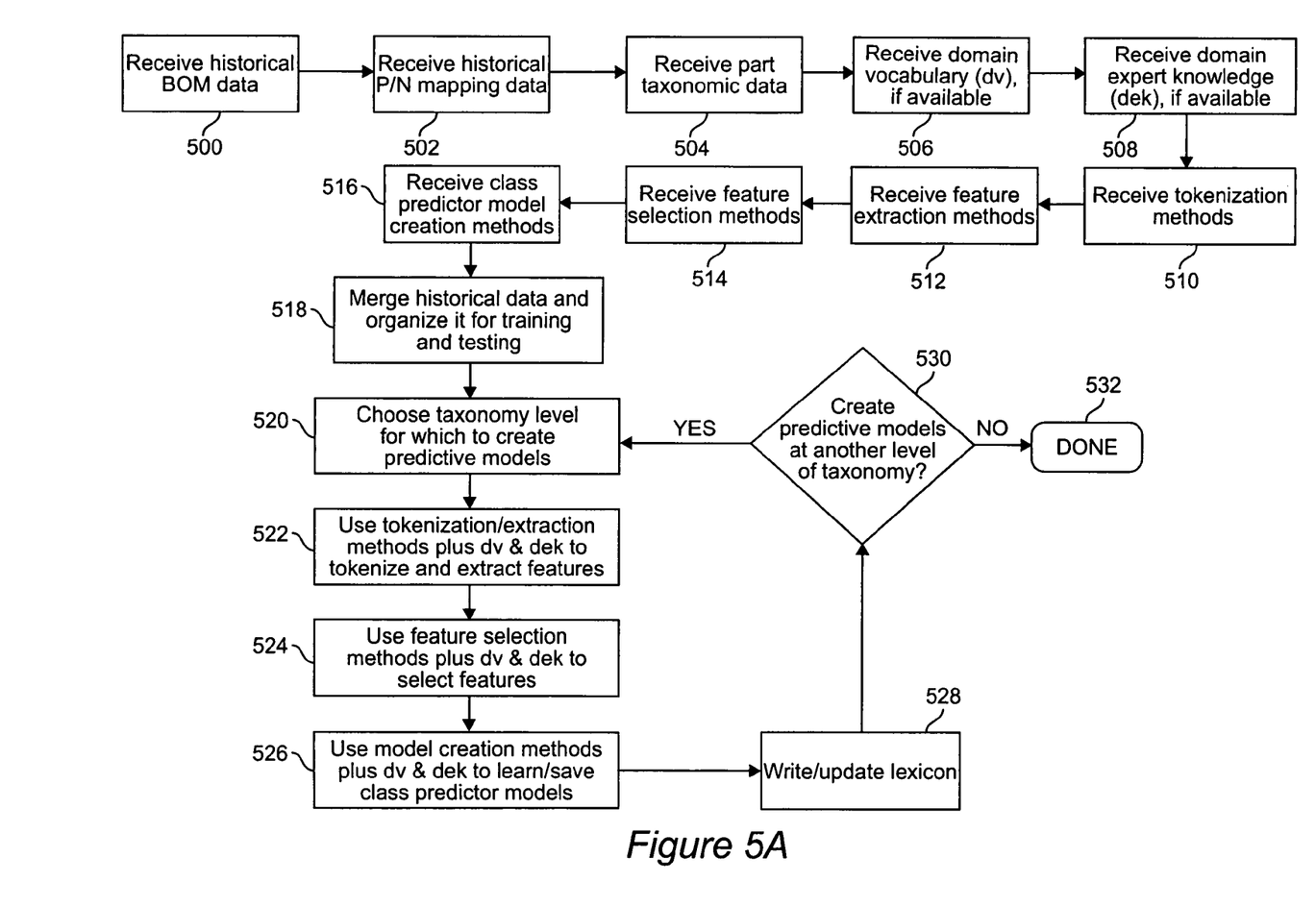
FIG. 5A is a flow chart showing the process of creating predictive models for the part taxonomy.

FIG. 5A is a flow chart showing the process of creating predictive models for the part taxonomy. In order to create the class prediction models, various types of data has to be acquired along with methods for doing specific tasks during the learning process. Thus, the process begins at input block 500 where the historical BOM data is received, followed by the steps of receiving the historical P/N mapping data at input block 502, receiving part taxonomic data at input block 504, receiving domain vocabulary (dv), if available, at input block 506, receiving domain expert knowledge (dek), if available, at input block 508. While the first three types of data are required, the latter two (dv and dek) are optional; if available, they would help enhance the performance of the models created, but are not necessary. The receipt of various kinds of data is followed by the steps of receiving various methods, including the steps of receiving tokenization methods at input block 510, receiving feature extraction methods at input block 512, receiving feature selection methods at input block 514, and receiving class predictor model creation methods at input block 516. Next, at function block 518, the historical data is merged and organized into training and testing data. The taxonomy level for which predictive models are created is chosen in function block 520. This can be determined a-priori, or via human input during the process. Following this, all the information about all the BOM items in the training data, such as part descriptions and supplier names, is broken down into tokens and features are extracted using the tokenization/extraction methods, plus any domain vocabulary (dv) and domain expert knowledge (dek), in function block 522. The training dataset is then transformed into a form suitable for automatic creation of the class prediction models by converting each BOM item in the training dataset from the original textual information to a set of features. Once the features have been created and used to transform the training data, the feature selection methods plus the domain vocabulary (dv) and domain expert knowledge (dek), if available, are applied to the data to select a subset of the available features in function block 524. This enables the elimination of any features that provide little or no help during the mapping process. The model creation methods plus domain vocabulary (dv) and domain expert knowledge (dek), if available, are used in function block 526 to learn and save class predictor models. Following this, in function block 528, the lexicon is updated by adding information about all the tokens and associated features that were created from the training data. Finally, at decision block 530, a determination is made as to whether to create predictive models at another level of taxonomy. If so, the process goes back to function block 520 to repeat the process from there; otherwise, the process is complete and exits at output block 532.

Figure 5B:
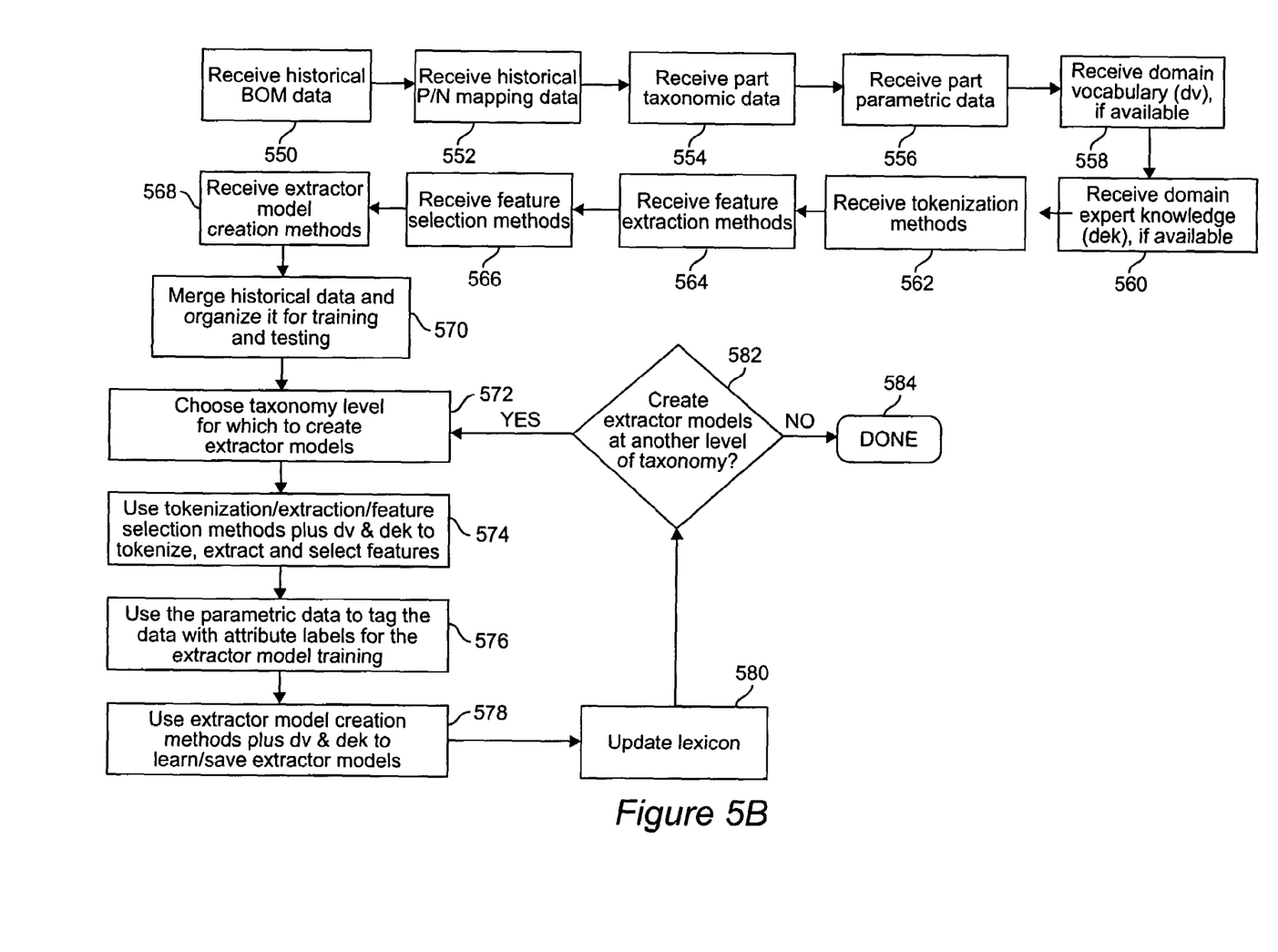
FIG. 5B is a flow chart showing the process of creating extractor models.

FIG. 5B is a flow chart showing the process of creating extractor models. As in the case of the class predictor models (FIG. 5A), in order to create the extractor models, various types of data has to be acquired along with methods for doing specific tasks during the learning process. Thus, the process begins at input block 550 where the historical BOM data is received, followed by the steps of receiving the historical P/N mapping data at input block 552, receiving part taxonomic data at input block 554, receiving part parametric data at input block 556, receiving domain vocabulary (dv), if available, at input block 558, and receiving domain expert knowledge (dek), if available, at input block 560. The receipt of the various types of data is followed by the steps of receiving tokenization methods at input block 562, receiving feature extraction methods at input block 564, receiving feature selection methods at input block 566, and receiving extractor model creation methods at input block 568. The methods received at any of the preceding steps may be the same as, or different from, the methods received in similar steps during the creation of class predictor models (FIG. 5A). Next, at function block 570, the historical and parametric data are merged and organized for training and testing. The taxonomy level for which extractor models are created is chosen in function block 572. Then, the inputted tokenization/extraction methods are used in function block 574, along with any available domain vocabulary (dv) and domain expert knowledge (dek) to tokenize the training data and extract features. These extracted features are used to transform the training data into a feature-based data set by replacing the tokens with associated features. Following this, the parametric data is used to tag the data with attribute labels for the extractor model training in function block 576. Tagging may involve explicit labeling of the various paramteric attributes and their values that may be present in the data, or it may simply be identification of such occurrences. The extractor model creation methods, plus any available domain vocabulary (dv) and domain expert knowledge (dek), are then used to learn and save extractor models in function block 578. Again, those experienced in the art will appreciate that extractor models may be of different levels of complexity. On one extreme, models learnt may be sufficiently complex as to automatically process textual information and determine which parametric attributes/values occur in that description. On the other extreme, models may be fairly simple in that they just do a string matching exercise to see if any parametric attributes/values that define the class of parts being looked at are present in the textual description or not. Once these extractor models are learned, then, in function block 580, the lexicon is updated with any new tokens/features that may have been created. Finally, at decision block 582, a determination is made as to whether to create extractor models at another level of taxonomy. If so, the process goes back to function block 572 to repeat the process from there; otherwise, the process is complete and exits at output block 584.

Figure 6:
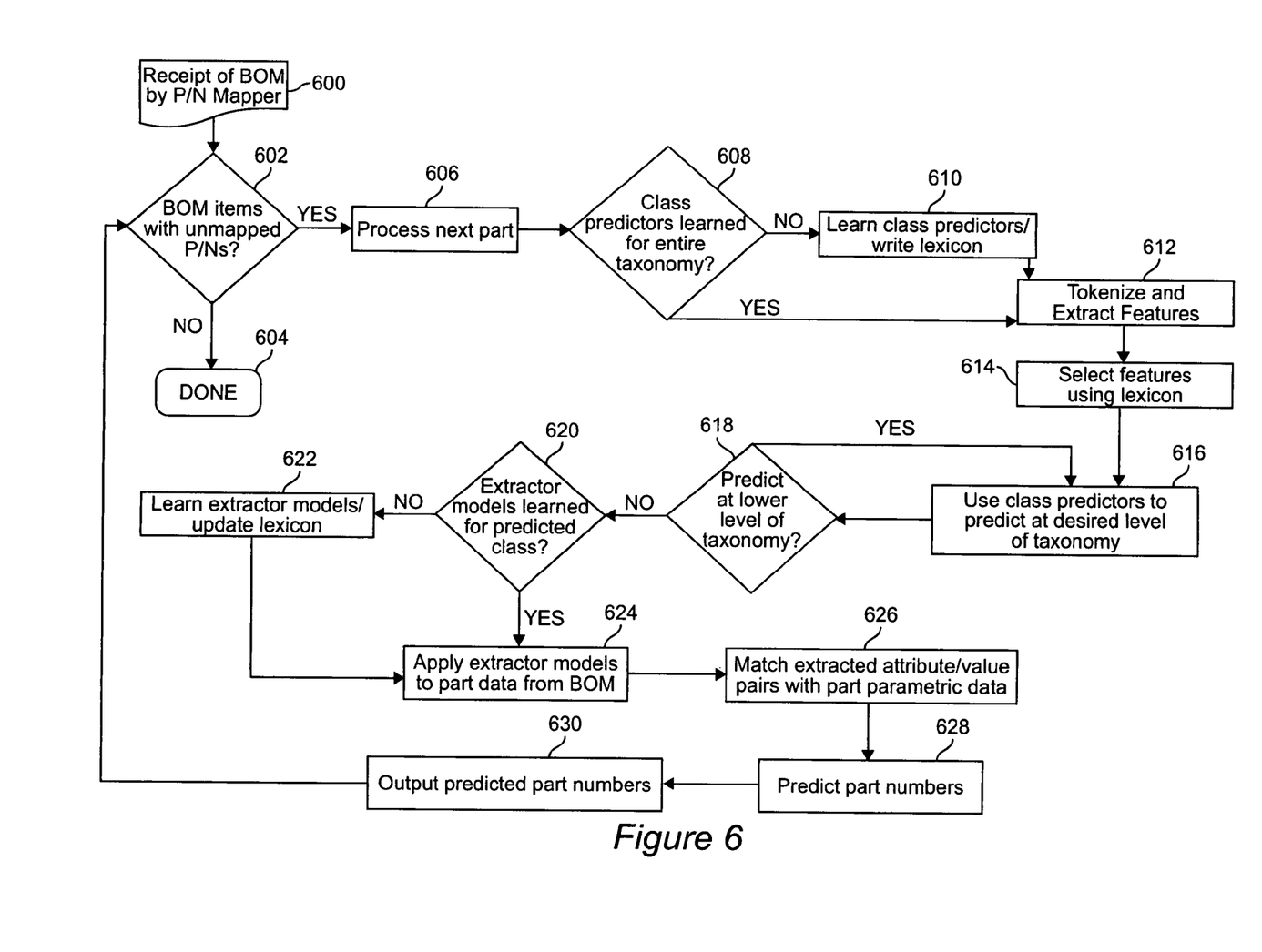
FIG. 6 is a flow chart showing the process of mapping part numbers using the part number mapper.

FIG. 6 is a flow chart showing the process of mapping part numbers using the part number mapper. The process begins at input block 600 where the BOM is received by the P/N mapper. A determination is made in decision block as to whether there are any BOM items with unmapped P/Ns. If not, the process is finished and exists at output block 604; otherwise, the next part is processed in function block 606. The mapping of an unmapped BOM part to an internal P/N takes place via a hierarchical, 2 part process. First, the given BOM part is mapped to an appropriate part class in the part taxonomy using the class predictor models. Following this, the BOM part is then mapped to successivly lower levels of the taxonomy as desired, again using appropriate class predictor models. Once the BOM part has been mapped to the lowest, appropriate part class in the taxonomy, then the extractor models are used to map the BOM part to an internal part number based on parametric information present in the BOM part description. These steps are described in more detail in the following sentences. A determination is made in decision block 608 as to whether class predictors have already been learned for the entire taxonomy. If not, the class predictors are learned (using the process described in FIG. 5A) and the lexicon is updated in function block 610 before going to function block 612; otherwise, the process goes directly to function block 612. In function block 612, the textual information about the BOM part under consideration, such a supplier name and part description, is tokenized and features are extracted. Next, a subset of the features created in function block 612 are selected using the lexicon in function block 614. This step ensures that only features that have been observed during the learning of the models are used for the classification task, as any new features that have not been previously observed are of no use since no previous information is available for such features. This is followed in function block 616 by using class predictors to predict at the desired level of taxonomy. The level of the taxonomy to start the classification at may be fixed a-priori, or may be set via human input. Once a class prediction has been made at this level of the taxonomy, a determination is then made in decision block 618 as to whether a lower level of taxonomy is to be predicted. If so, the process loops back to function block 616 to predict the class at the next lower level of the taxonomy; otherwise, the process moves on to predict the internal part number from amongst all the parts within the predicted class. So, a determination is next made in decision block 620 as to whether extractor models have been learned for the predicted class. If not, extractor models are learned (using the process described in FIG. 5B) and the lexicon is updated before going to function block 624; otherwise, the process goes directly to function block 624. At function block 624, the extractor models are applied to the part data from th BOM. This enables the determination of the set of parameters, and their values, that have been defined for the part in question in the part's description in the BOM, and helps further limit the set of candidate parts to the subset of parts within the predicted class that have at least the same parameters and values as the given part. This is done in function block 626, where the extracted attribute/value pairs are matched with part parametric data followed by function block 628 where the part numbers are predicted and outputted. A return is then made to decision block 602 to determine if the process has completed, or whether there are more BOM parts that need to be mapped.

Figure 7:
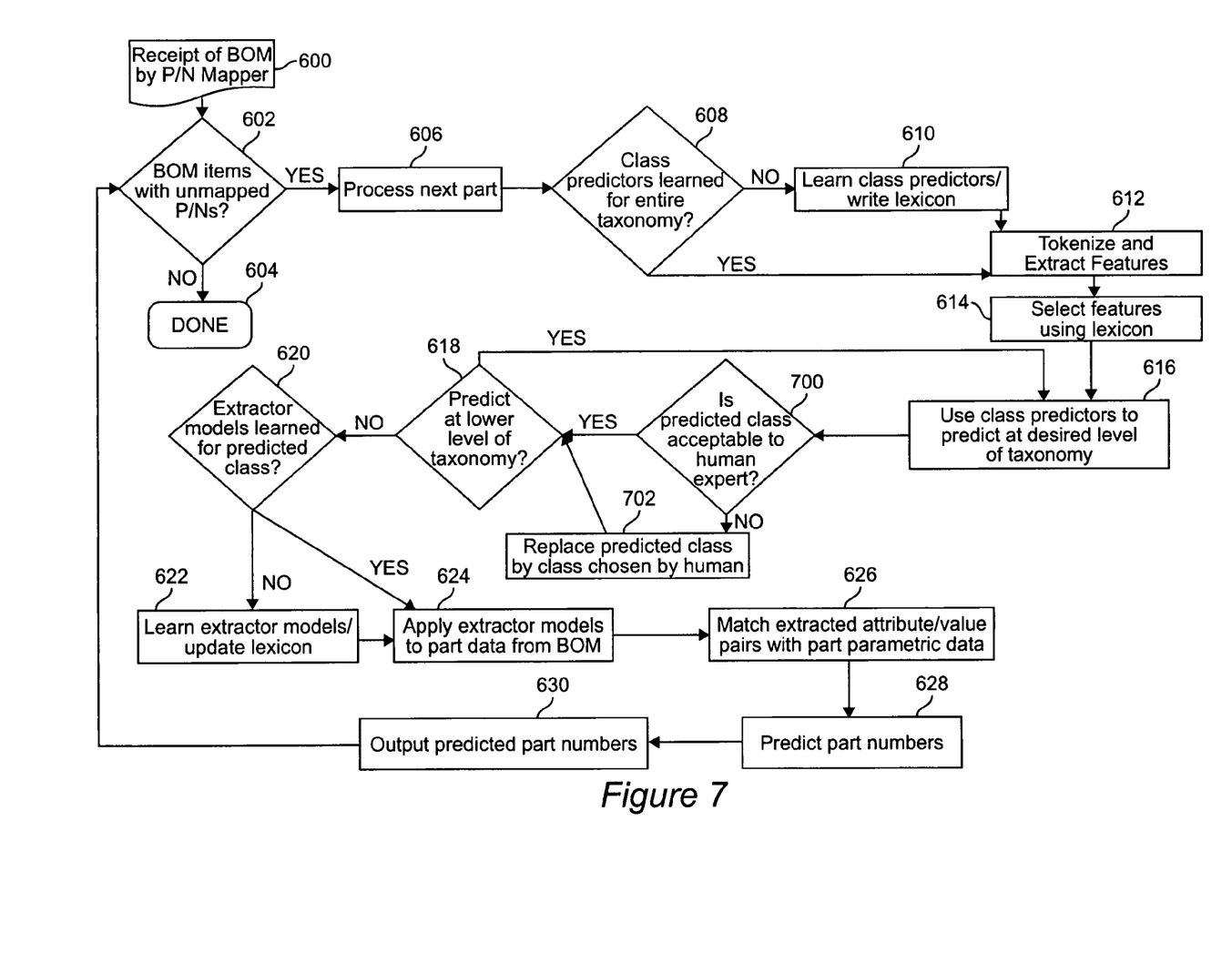
FIG. 7 is a flow chart showing one kind of manual intervention use during the process of mapping part numbers using the part number mapper.

FIG. 7 is a flowchart showing one kind of manual intervention use during the process of mapping part numbers using the part number mapper. The process, as described in FIG. 6, is extended by introducing two additional steps, 700 and 702, to allow humans to intervene and potentially change intervening results. While most of the process continues as before (as described in FIG. 6), the class predicted at a particular level of the taxonomy by the class predictors in function block 616 is now shown to an human expert for approval in function block 700. If the human approves the mapping, the process proceeds as before to function block 618. If, however, the human feels that the predicted class is incorrect, then the human may replace that class by one which is better in his or her opinion in function block 702. The process than continues on to function block 618. By allowing such human intervention to take place, the accuracy of the mapping process is greatly enhanced as it helps correct any errors as early as possible without which an mistake in the class mapping process would be compounded as the process continues.

Figure 8:
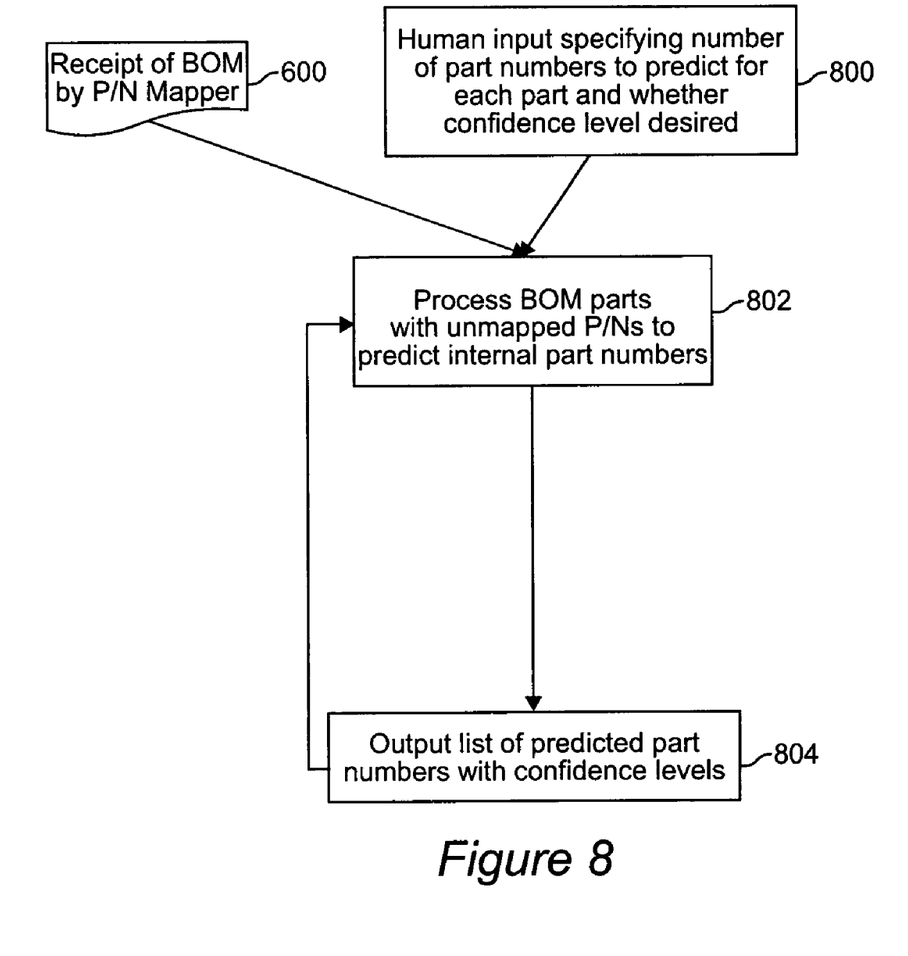
FIG. 8 is a flow chart showing the process of mapping part numbers where a list of part numbers, along with associated confidence levels, is predicted for each BOM part.

FIG. 8 is a flowchart showing the process of mapping part numbers where, instead of predicting exactly one part number, a list of part numbers, along with associated confidence levels, is predicted for each BOM part. This process is a simple extension to the mapping process described in FIG. 6. In addition to the receipt of a BOM by the P/N mapper 600, the process also receives input from a human specifying the number of parts to be predicted for each part and whether confidence level in each predicted part is desired. The BOM is then processed as before (using the process described in FIG. 6) to map the unmapped P/N in a BOM item to internal part numbers in function block 802, the only difference being that a list of predicted part number is now produced in function block 804. In addition to the predicted part numbers, a confidence level is also generated which is a quantitative measure of how confident the system is that each predicted part number is in fact the correct internal part number for the BOM item being mapped, the higher the confidence level, the better is the prediction. The process is then repeated as long as any unmapped BOM items are still left in the BOM.

Those skilled in the art will appreciate that this process can be extended further to allow all steps of predicting classes, such as in function block 616 of FIG. 6, to predict a list of classes with associated confidence levels, instead of predicting just one class which then becomes a special case of this more general scenario.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A system for automated mapping of part numbers associated with parts in bills of materials (BOMs), submitted by a plurality of BOM originators to a BOM receiver, to the BOM receiver's internal part numbers, the system comprising a computer having a processor, a memory operatively coupled to the processor, wherein the memory stores instructions that when executed by the processor perform operations comprising:

receiving historical BOM data describing BOMs received by the BOM receiver, from a plurality of BOM originators, over a time history;

receiving known mapping data defining historical mappings between the BOM receiver's internal assigned part numbers and the BOM originators' various assigned part numbers;

receiving part description parameters describing a plurality of parts to which the BOM receiver has assigned internal part numbers;

learning by computer methods mapping prediction models for predicting BOM internal part numbers based on received BOMs from the plurality BOM originators, based on the historical BOM data, mapping data and part parametric data, wherein said computer methods include feature extraction for tokenizing a textual description of parts according to a token scheme and generating a corresponding list of parametric features based on the extracted tokens, wherein said computer methods form said learned mapping prediction models according to a multi-level taxonomy arranged for a hierarchical prediction mapping, including initially predicting a class of an unmapped part based on received information, and traversing down levels of the taxonomy, predicting the sub-class of the unmapped part at each subsequent level and, at a leaf level of the multi-level taxonomy, classifying the unmapped part to a BOM receiver internal part number based on the parametric features extracted from the BOM originator textual description of the unmapped part;

learning said prediction models from said historical BOM data, known mapping data, and part description parameters, using said methods of learning, and generating resulting learned prediction models;

receiving a BOM from a BOM originator, said BOM describing parts according to BOM originator assigned part numbers, wherein at least one of said BOM originator assigned part numbers is an unmapped part number not within said historical mapping data;

predicting a BOM receiver internal part number associated with at least one part described by said BOM having an unmapped part number, said predicting including applying at least one of said learned prediction models to said received BOM bill of materials; and generating a release data having said predicted BOM receiver internal part number.

* * * * *